No. 674,116. Patented May 14, 1901.
R. KIFT.
FLOWER HOLDER.
(Application filed Dec. 4, 1899.)

(No Model.)

Witnesses
Harry S. Rohrer
Robert J. Arundel

Inventor
Robert Kift
By Walter W. Calmore
Attorney

UNITED STATES PATENT OFFICE.

ROBERT KIFT, OF PHILADELPHIA, PENNSYLVANIA.

FLOWER-HOLDER.

SPECIFICATION forming part of Letters Patent No. 674,116, dated May 14, 1901.

Application filed December 4, 1899. Serial No. 739,080. (No model.)

*To all whom it may concern:*

Be it known that I, ROBERT KIFT, a citizen of the United States, residing at Philadelphia, in the county of Philadelphia and State of Pennsylvania, have invented certain new and useful Improvements in Flower-Holders, of which the following is a specification, reference being had therein to the accompanying drawings.

My invention relates to flower-holders; and its object is to provide a receptacle especially adapted to contain a single flower and preserve it fresh by water.

The improvement comprises a small vessel of cylindrical or vial form having an elastic cap provided with an opening for the passage of the stem of a flower and serving the double purpose of a closure for the vessel and a support for the flower-stem.

The invention also comprises means for facilitating the insertion of the receptacle into the ground and for suspending it from a suitable support in arranging floral decorations.

The construction of the invention and its novel features will be fully described hereinafter and defined in the appended claims, in connection with the accompanying drawings, which form a part of this specification.

Figure 1:
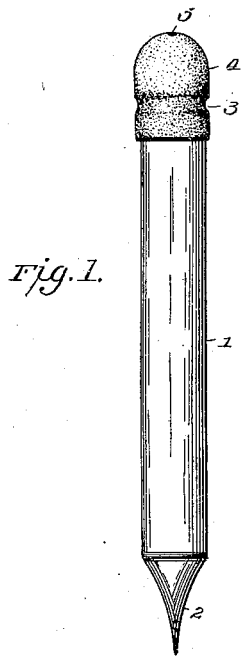
Figure 2:
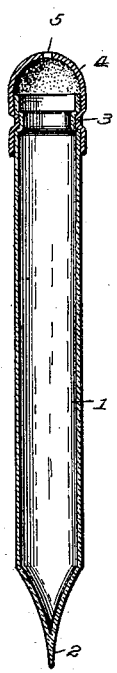
Figure 3:
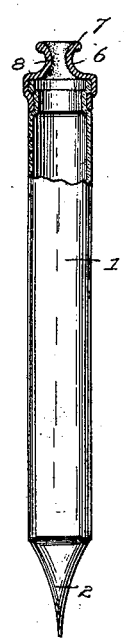
Figure 4:
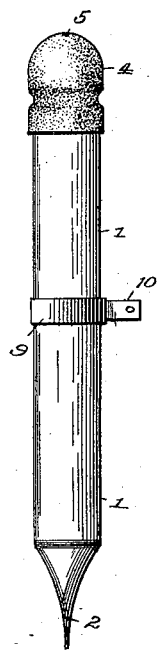

In the drawings, Figure 1 is a side elevation of a flower-holder embodying the invention. Fig. 2 is a vertical section of the same. Fig. 3 is a side elevation, partly in section, of a modified construction of closure for the vessel; and Fig. 4 shows the holder supported by a suspending-clamp.

The reference-numeral 1 designates a cylinder, preferably of glass, closed at its lower end by a sharpened cone 2 and open at its upper end. The vessel 1 is formed near its upper end with an annular groove or depression 3, adapted to be engaged by a rubber cap 4, the walls of which fit into the groove of the vessel. The cap 4 is formed with a central orifice 5, through which the stem of a flower is to be inserted. The vessel is adapted to be filled with water, after which the cap is placed in position and the stem of the flower inserted through the cap. The cap thus serves to close the vessel to prevent the spilling of the water and also sustains the flower in upright position.

In Fig. 3 I have shown a modified form of cap, provided with a tubular extension 6, having a flaring mouth 7 and rounded inner walls 8, which are adapted to bear yieldingly upon the stem of the flower. This construction is well adapted for orchids or other flowers having very delicate or tender stems.

The utility of the invention will be appreciated in connection with floral decorations for rooms, tables, &c., each flower having its separate holder and being kept fresh by the water in the holder.

It is designed to suspend the holders by suitable means, thus permitting of the formation of garlands or designs of ornamental character.

In Fig. 4 I have shown a clamp comprising a ring 9, embracing the vessel and secured to a curved arm 10, formed with an opening through which a suspending rod or wire is adapted to pass.

The sharpened lower end of the vessel adapts it to be inserted into the ground or into the earth in a flower-pot or hanging basket. Floral decorations when arranged with the aid of my improvement are fresher in appearance and will remain so for a considerable length of time.

I claim—

1. A flower-holder comprising a cylinder closed and pointed at its lower end, and a removable rubber cap formed with a central orifice.

2. A flower-holder comprising a cylinder closed and pointed at its lower end, and a rubber cap having a tubular extension provided with a flaring mouth having rounded walls.

In testimony whereof I affix my signature in the presence of two witnesses.

ROBERT KIFT.

Witnesses:
   FENTON H. MIDDLETON,
   WALTER W. CALMORE.